United States Patent [19]

Falke et al.

[11] Patent Number: 6,093,342
[45] Date of Patent: *Jul. 25, 2000

[54] PREPARATION OF A HOMOGENEOUS, DEMIXING-STABLE POLYOL COMPONENT

[75] Inventors: Peter Falke, Schwarzheide; Regina Hendreich, Frauendorf; Marita Schuster, Senftenberg; Bernd Zaschke, Dresden, all of Germany

[73] Assignee: BASF Aktiengesellschaft, Ludwigshafen, Germany

[ * ] Notice: This patent is subject to a terminal disclaimer.

[21] Appl. No.: 09/024,786

[22] Filed: Feb. 17, 1998

[30] Foreign Application Priority Data

Feb. 17, 1997 [DE] Germany ............................. 19705993

[51] Int. Cl.$^7$ ....................................................... C09K 3/00
[52] U.S. Cl. .................................. 252/182.2; 252/182.24; 252/182.26; 252/182.27; 252/182; 252/29; 521/128; 521/155; 521/164; 521/167; 521/170; 521/174
[58] Field of Search .......................... 252/182.24, 182.27, 252/182.2, 182.26, 182.29; 521/155, 170, 174, 167, 164, 128

[56] References Cited

U.S. PATENT DOCUMENTS

| | | |
|---|---|---|
| 4,093,569 | 6/1978 | Reischl et al. . |
| 4,385,133 | 5/1983 | Alberino et al. . |
| 4,469,821 | 9/1984 | Anderson . |
| 4,530,941 | 7/1985 | Turner et al. . |
| 4,576,731 | 3/1986 | Rieck ................................. 252/182.22 |
| 4,644,015 | 2/1987 | Scaccia et al. ......................... 521/129 |
| 5,134,172 | 7/1992 | Bruyninckx et al. . |
| 5,344,853 | 9/1994 | Knipp et al. . |

FOREIGN PATENT DOCUMENTS

| | | |
|---|---|---|
| 0 136 396 A2 | 4/1985 | European Pat. Off. . |
| 0 404 441 A1 | 12/1990 | European Pat. Off. . |
| 0 579 080 A2 | 1/1994 | European Pat. Off. . |
| 156 872 | 7/1980 | Germany . |
| 3338 235 A1 | 10/1983 | Germany . |

*Primary Examiner*—John M. Cooney, Jr.
*Attorney, Agent, or Firm*—Fernando A. Borrego

[57] ABSTRACT

A homogeneous, demixing-stable polyol component comprising at least two relatively high molecular weight compounds containing at least two reactive hydrogen atoms and, if desired, low molecular weight chain extenders and/or crosslinkers and also, if desired, blowing agents, catalysts and further auxiliaries and/or additives is prepared by adding at least one amine and at least one organic and/or modified organic isocyanate to this component.

This polyol component is useful for producing polyurethanes, in particular compact and foamed polyurethanes.

18 Claims, No Drawings

PREPARATION OF A HOMOGENEOUS, DEMIXING-STABLE POLYOL COMPONENT

The present invention relates to a process for preparing a homogeneous polyurethane component comprising at least two relatively high molecular weight compounds containing at least two reactive hydrogen atoms, in particular two generally immiscible polyols, and, if desired, proportions of chain extenders and/or crosslinkers, blowing agents, catalysts and also further auxiliaries and/or additives.

These components comprising immiscible or not readily miscible polyols frequently tend to demix after a short time. This applies particularly to mixtures of polyols which are very high or low in ethylene oxide or are free of ethylene oxide, as well as mixtures of polyether alcohols and polyester alcohols.

The present invention describes a process by means of which a mixture which is demixing-stable over the long term can be achieved by addition of small amounts of primary and/or secondary amines and/or alkanolamines and subsequent reaction of the polyol component homogenized in this way with small amounts of isocyanates and/or compounds bearing NCO groups.

The production of polyurethanes (PUR) by reacting organic and/or modified organic polyisocyanates or prepolymers with higher-functional compounds containing at least two reactive hydrogen atoms, for example polyoxyalkylenepolyamines and/or preferably organic polyhydroxyl compounds, in particular polyetherols having molecular weights of, for example, from 300 to 6000, and, if desired, chain extenders and/or crosslinkers having molecular weights up to about 400 in the presence of catalysts, blowing agents, auxiliaries and/or additives is known and has been described many times. A summary overview of the production of polyurethanes is given, for example, in the Kunststoff-Handbuch, Volume VII, "Polyurethane", 1st edition 1966, edited by Dr. R. Vieweg and Dr. A. Höchtlen and also 2nd edition, 1983, and 3rd edition, 1993, each edited by Dr. G. Oertel (Carl Hanser Verlag, Munich).

For numerous applications, it is frequently desirable to prepare demixing-stable polyol mixtures comprising polyether alcohols and polyester alcohols or comprising polyether alcohols which are rich in ethylene oxide and polyether alcohols which are low in or free of ethylene oxide as a homogeneous polyurethane component, if desired with addition of chain extenders and/or crosslinkers, blowing agents, catalysts and further auxiliaries and/or additives. However, a disadvantage is the fact that these polyol mixtures do not remain homogeneous, but form separate phases after a relatively short time.

In JP-A-07110617, attempts are made to improve the miscibility of such components by means of a specific polyol structure. This requires specific compatibility-promoting polyols which are otherwise not necessary in the system.

In JP-A-04136017, an improvement in the miscibility is achieved by addition of a monoepoxide to an OH-terminated polydiene which is not miscible with the main polyol.

JP-A-6/3202610 discloses a mixture of a specific composition comprising polyester alcohols and polyether alcohols in which improved compatibility of the polyether alcohols/polyester alcohols is said to be achieved by means of chain extenders.

DE-A-3339235 describes short-chain polyester alcohols which are said to be miscible with polyether alcohols. The specified esters based on phthalic anhydride are usable to only a limited extent for PUR.

EP-A-0136396 discloses monofunctional polyetherols which are prepared from specific epoxides. As a result, they have better miscibility with other polyols. A disadvantage is the additional structures introduced into the system, which structures effect no improvement in the end product properties.

DD 156872 discloses partially esterified polyetherols as compatibilizing components. This process requires an additional technological step and in addition adversely affects the end product properties.

In U.S. Pat. No. 4,385,133, polyols which are rich in ethylene oxide are used as solubilizers. These derivatives frequently have only a limited usability in the PUR systems since they have a strong influence on reactivity and cell opening.

JP 61247739 discloses a specific polyether-modified siliconediol which is said to be readily miscible even with polyetherols and polyesterols.

U.S. Pat. No. 4,093,569 describes a process for preparing urea dispersions by reacting amines and isocyanates in the presence of at least 4% by weight of water. The object of that invention is the achievement of high solids contents at low polyol viscosities. The authors find that, under these conditions, the solid dispersion particles function as a compatibilizing agent between polyetherols and polyesterols.

EP-A-0404441 claims a polyol component whose phase stability is achieved by mixing in solubilizing proportions of dispersed PUR and/or PUR/polyurethane. A shelf life of about 30 days is said to be achieved in this way.

It is an object of the present invention to develop a process for preparing homogeneous polyol components which do not demix and comprise at least two immiscible or not readily miscible relatively high molecular weight compounds containing at least two reactive hydrogen atoms and, if desired, low molecular weight chain extenders and/or crosslinkers and also, if desired, blowing agents, catalysts and further auxiliaries and/or additives.

We have found that this object is achieved by adding at least one amine and at least one organic and/or modified organic isocyanate to the mixture of the starting materials mentioned.

The present invention accordingly provides a process for preparing a homogeneous, demixing-stable polyol component comprising at least two relatively high molecular weight compounds containing at least two reactive hydrogen atoms and, if desired, low molecular weight chain extenders and/or crosslinkers and also, if desired, blowing agents, catalysts and further auxiliaries and/or additives, wherein at least one amine and at least one organic and/or modified organic isocyanate are added to this component, as well as the corresponding demixing-stable polyol component.

The present invention also provides for the use of this polyol component for producing PUR, in particular compact and foamed PUR.

Surprisingly, we have found that storage-stable mixtures of immiscible or only sparingly miscible polyols are obtained when these are admixed with specific amine derivatives, in particular primary amines, and this mixture is reacted with a small amount of isocyanate. The mixing of even small proportions of primary and/or secondary amines and/or alkanolamines into the mixture homogenized by stirring together a plurality of polyols and also, if desired, chain extenders and/or crosslinkers and further auxiliaries and/or additives in combination with subsequent reaction of the mixture thus produced with small proportions of added isocyanates or compounds bearing NCO groups is sufficient to obtain a homogeneous component which is storage-stable in the long term. The species thus formed effectively prevent phase separation. There is a slight increase in viscosity of the component which also indicates the success of the reaction. Owing to the small amounts which react, no temperature increase is observed.

According to the present invention, this process makes it possible to use immiscible or only sparingly miscible relatively high molecular weight compounds containing at least two reactive hydrogen atoms in a polyol component. As relatively high molecular weight compounds containing at least two reactive hydrogen atoms, preference is given to those containing acidic H atoms, in particular polyetherols and/or polyesterols. It is particularly useful to employ this process when using polyols which tend to demix again after a short time. This applies particularly to mixtures of polyols which are very high or low in ethylene oxide or are free of ethylene oxide, as well as mixtures of polyether alcohols and polyester alcohols.

Examples which may be mentioned are mixtures of flexible foam polyetherols (OHN<60 mg KOH/g) with adipic esters (mean molecular weight>1000 g/mol) or mixtures of cell-opener polyols rich in ethylene oxide (ethylene oxide content>60%) and polypropylene glycols, which generally demix after a short time.

The polyols used preferably have a mean molecular weight of from 300 to 10,000 g/mol.

Possible ways of preparing these compounds are indicated below by way of example in the description of the component (b).

The not readily miscible or immiscible polyols used are advantageously employed in a weight ratio to one another of from 1:99 to 99:1, preferably from 10:90 to 90:10.

The proportion of the polyols, based on the polyol component, is a total of from 1 to 95% by weight.

Apart from said immiscible or only sparingly miscible relatively high molecular weight compounds containing at least two reactive hydrogen atoms, further relatively high molecular weight compounds having at least two hydrogen atoms which are customary in PUR chemistry and are readily miscible with the components described can also be incorporated into the polyol component. Examples of such further relatively high molecular weight reactive compounds are described below in the description of component (b).

The homogeneous, demixing-stable polyol component is produced according to the present invention by adding small amounts of specific amine derivatives to the constituents of the polyol component comprising at least two relatively high molecular weight compounds containing at least two reactive hydrogen atoms and also, if desired, low molecular weight chain extenders and/or crosslinkers, blowing agents, catalysts and further auxiliaries and/or additives. This mixture is stirred to mix it thoroughly. A small amount of an isocyanate is added thereto and the entire mixture is stirred. In an advantageous embodiment, the mixture is stirred intensively for about 20 minutes at room temperature after addition of the isocyanates.

It is also possible to stir the isocyanate used with part of the base polyol before preparation of the demixing-stable polyol component and then to add the other constituents of the polyol component while stirring.

If water is used as blowing agent, it has been found to be useful to add this not during the preparation of the dispersion, but to add it to the polyol component only later, shortly before producing the PUR. Likewise, further system constituents of the polyol component can also be added subsequently.

According to the present invention, amines used are preferably primary and/or secondary amines, particularly preferably primary amines. These amines should be polyfunctional, but may also contain proportions of monofunctional amines. Preference is given to using aliphatic and/or cycloaliphatic amines. The amine derivatives can contain further functional groups such as —OH or —SH. Proportions of alkanolamines and amine mixtures can likewise be used.

Examples which may be mentioned are: hexamethylenediamine, ethylenediamine, 2,2'-dimethyl-4, 4'-methylenebiscyclohexylamine, polyols bearing $NH_2$ groups, eg. Jeffamine products, 3,3'-imidopropylamine, fatty amines, diethylenetriamine, triethylenetetramine, propylenediamines, butylenediamines, diethanolamine and ethanolamine.

Furthermore, according to the present invention, it is also possible to use aromatic amines customary in polyurethane chemistry, for example tolylenediamines, in particular diethyltolylenediamine, or amines of the diphenylmethane series.

Preference is given to using 2,2'-dimethyl-4,4'-methylenebiscyclohexylamine, coconut fatty amine and N-oleylpropylenediamine.

The amines are employed in amounts of from 0.05 to 7% by weight, preferably from 0.5 to 3.0% by weight, based on the weight of the polyol component.

The polyol component to which the corresponding primary or secondary amine has been added then has at least one organic and/or modified organic isocyanate mixed into it with stirring or another suitable mixing technique. Isocyanates which can be used for this purpose are, in principle, all those mentioned below as component (a). However, preference is given to using aromatic isocyanates. Particular preference is given to using tolylene 2,4- and 2,6-diisocyanates, diphenylmethane 4,4'- and 2,4'-diisocyanates, polyphenylpolymethylene polyisocyanates and prepolymers containing NCO groups and also mixtures of these compounds. The organic and/or modified organic isocyanates are used in amounts of from 0.05 to 5% by weight, preferably from 0.05 to 2.0% by weight, based on the weight of the polyol component.

Particularly the demixing-stable polyol components are achieved when from 0.5 to 2.0% by weight of amine and from 0.5 to 2.0% by weight of isocyanate are processed together with the other constituents of the polyol component.

The reaction occurring after addition of the organic and/or modified organic isocyanates is made apparent by a rise in the viscosity.

The demixing-stable polyol component prepared according to the resent invention is homogeneous and stable to settling even on prolonged storage. The otherwise necessary stirring of the polyol component before processing is not required.

The homogeneous, demixing-stable polyol component prepared according to the present invention comprises at least two relatively high molecular weight compounds containing at least two reactive hydrogen atoms and, if desired, low molecular weight chain extenders and/or crosslinkers and also, if desired, blowing agents, catalysts and further auxiliaries and/or additives and can be prepared by addition of at least one amine and at least one organic and/or modified organic isocyanate.

It is preferably used for producing polyurethanes.

The polyurethanes are produced in a manner known per se by reacting a) organic and/or modified organic isocyanates with b) at least two relatively high molecular weight compounds containing at least two reactive hydrogen atoms and also, if desired,
c) low molecular weight chain extenders and/or crosslinkers,
d) blowing agents,
e) catalysts and
f) further auxiliaries and/or additives.

According to the present invention, a storage-stable, homogeneous polyol component is first prepared as described above from the components (b) and, if desired, (c) to (f) in combination with at least one amine and at least one organic and/or modified organic isocyanate, and this polyol component is then, preferably after storage and possibly with addition of further components (b) to (f) or proportions of these components, reacted with the component (a).

To produce the homogeneous, demixing-stable polyol component and the PUR based thereon, use is made not only of the above-described specific and preferred compounds but also of the formative components known per se, about which the following details may be given:

a) Suitable organic and/or modified organic isocyanates for producing the PUR according to the present invention and for stabilizing the polyol component are the aliphatic, cycloaliphatic, araliphatic and preferably aromatic polyfunctional isocyanates known per se.

Specific examples are: alkylene diisocyanates having from 4 to 12 carbon atoms in the alkylene radical, eg. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (raw MDI) and mixtures of raw MDI and tolylene diisocyanates. The organic diisocyanates and polyisocyanates can be used individually or in the form of their mixtures.

Use is frequently also made of modified polyfunctional isocyanates, ie. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups. Specific examples are: organic, preferably aromatic polyisocyanates containing urethane groups and having NCO contents of from 33.6 to 15% by weight, preferably from 31 to 21% by weight, based on the total weight, for example diphenylmethane 4,4'-diisocyanate modified with low molecular weight diols, triols, dialkylene glycols, trialkylene glycols or polyoxyalkylene glycols having molecular weights of up to 6000, in particular molecular weights up to 1500, modified diphenylmethane 4,4'- and 2,4'-diisocyanate mixtures or modified raw MDI or tolylene 2,4- or 2,6-diisocyanate; the dialkylene or polyoxyalkylene glycols can be used individually or as mixtures. Examples which may be mentioned are: diethylene glycol, dipropylene glycol, polyoxyethylene, polyoxypropylene and polyoxypropylene-polyoxyethene glycols, triols and/or tetrols.

Also useful are prepolymers containing NCO groups, having NCO contents of from 25 to 3.5% by weight, preferably from 21 to 14% by weight, based on the total weight, and prepared from the polyester polyols and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or raw MDI. Further modified polyisocyanates which have been found to be useful are liquid polyisocyanates containing carbodiimide groups and/or isocyanuric groups and having NCO contents of from 33.6 to 15% by weight, preferably from 31 to 21% by weight, based on the total weight, eg. those based on diphenylmethane 4,4'-, 2,4'- and/or 2,2'-diisocyanate and/or tolylene 2,4- and/or 2,6-diisocyanate. The modified polyisocyanates can, if desired, be mixed with one another or with unmodified organic polyisocyanates such as diphenylmethane 2,4'- and/or 4,4'-diisocyanate, raw MDI, tolylene 2,4- and/or 2,6-diisocyanate.

Organic polyisocyanates which have been found to be particularly useful and are therefore preferably employed are: tolylene diisocyanate, MDI, raw MDI, mixtures of tolylene diisocyanates and raw MDI or mixtures of modified organic polyisocyanates containing urethane groups and having an NCO content of from 33.6 to 15% by weight, in particular those based on tolylene diisocyanates, diphenylmethane 4,4'-diisocyanate, diphenylmethane diisocyanate isomer mixtures or raw MDI and, in particular, raw MDI having a diphenylmethane diisocyanate isomer content of from 30 to 80% by weight, preferably from 30 to 55% by weight.

b) As relatively high molecular weight compounds containing at least two reactive hydrogen atoms, use is preferably made according to the present invention of the above-described immiscible or only sparingly miscible compounds. In addition, further customary relatively high molecular weight compounds containing reactive hydrogen atoms can be used, advantageously those having a functionality of from 2 to 4, preferably from 2 to 3, and a molecular weight of from 300 to 10,000, preferably from 300 to 6000.

Compounds of this type which have been found to be useful are, for example, polyetherpolyamines and/or preferably polyols selected from the group consisting of polyether polyols, polyester polyols, polythioether polyols, polyesteramide, hydroxyl-containing polyacetals and hydroxyl-containing aliphatic polycarbonates or mixtures of at least two of the polyols mentioned. Preference is given to using polyester polyols and/or polyether polyols. The hydroxyl number of the polyhydroxyl compounds is generally from 20 to 80 and preferably from 28 to 56.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. These dicarboxylic acids can be used either individually or in a mixture with one another. In place of the free dicarboxylic acids, it is also possible to use the corresponding dicarboxylic acid derivatives such as dicarboxylic esters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is also possible to use polyester polyols derived from lactams, eg.

ε-caprolactam, or hydroxycarboxylic acids, eg.
ω-hydroxycaproic acid.

To prepare the polyester polyols, the organic, eg. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc., in the melt at from 150 to 250° C., preferably from 180 to 220° C., under atmospheric or reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distil off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2. The polyester polyols obtained preferably have a functionality of from 2 to 4, in particular from 2 to 3, and a molecular weight of from 480 to 3000, in particular from 600 to 2000.

However, polyols which are particularly preferably used are polyether polyols which are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 4, preferably 2 or 3, reactive hydrogen atoms in bonded form, or by cationic polymerization using Lewis acids such as antimony pentachloride, boron fluoride etherate, etc., or bleaching earth as catalysts.

For specific applications, it is also possible for monofunctional initiators to be incorporated into the polyether structure. Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures.

Examples of suitable initiator molecules are: water, organic dicarboxylic acids such as succinic acid, adipic acid, phthalic acid and terephthalic acid, aliphatic and aromatic, unalkylated, N-monoalkylated, N,N- and N,N'-dialkylated diamines having from 1 to 4 carbon atoms in the alkyl radical, for example monoalkylated and dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine and 4,4'-, 2,4'- and 2,2'-diaminodiphenylmethane. Other suitable initiator molecules are: alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using polyhydric, in particular dihydric and/or trihydric alcohols such as ethanediol, 1,2- and 2,3-propanediol, diethylene glycol, dipropylene glycol, 1,4-butanediol, 1,6-hexanediol, glycerol, trimethylolpropane and pentaerythritol.

The polyether polyols, preferably polyoxypropylene and polyoxypropylene-polyoxyethylene polyols, have a functionality of preferably from 2 to 4 and in particular from 2 to 3 and molecular weights of from 300 to 8000, preferably from 300 to 6000 and in particular from 1000 to 5000, and suitable polyoxytetramethylene glycols have a molecular weight up to about 3500.

Further suitable polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, eg. in a weight ratio of from 90:10 to 10:90, preferably from 70:30 to 30:70, advantageously in the abovementioned polyether polyols using methods similar to those described in the German Patents 1111394, 1222669 (U.S. Pat. Nos. 3,304,273, 3,383,351, 3,523,093), 1152536 (GB 1040452) and 1152537 (GB 987618), and also polyether polyol dispersions which contain as disperse phase, usually in an amount of from 1 to 50% by weight, preferably from 2 to 25% by weight: eg. polyureas, polyhyrazides, polyurethanes containing bonded tert-amino groups and/or melamine and are described, for example, in EP-B-011752 (U.S. Pat. No. 4,304,708), U.S. Pat. No. 4,374,209 and DE-A-3231497.

Like the polyester polyols, the polyether polyols can be used individually or in the form of mixtures. They can also be mixed with the graft polyether polyols or polyester polyols or the hydroxyl-containing polyesteramides, polyacetals, polycarbonates and/or polyetherpolyamines.

Suitable hydroxyl-containing polyacetals are, for example, the compounds which can be prepared from glycols such as diethylene glycol, triethylene glycol, 4,4'-dihydroxyethoxydiphenyldimethylmethane or hexanediol and formaldehyde. Suitable polyacetals can also be prepared by polymerization of cyclic acetals.

Suitable hydroxyl-containing polycarbonates are those of the type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

The polyesteramides include, for example, the predominantly linear condensates obtained from polybasic, saturated and/or unsaturated carboxylic acids or their anhydrides and polyfunctional saturated and/or unsaturated aminoalcohols or mixtures of polyfunctional alcohols and aminoalcohols and/or polyamines.

Suitable polyetherpolyamines can be prepared from the abovementioned polyether polyols by known methods. Examples which may be mentioned are the cyanoalkylation of polyoxyalkylene polyols and subsequent hydrogenation of the nitrile formed (U.S. Pat. No. 3,267,050) or the partial or complete amination of polyoxyalkylene polyols using amines or ammonia in the presence of hydrogen and catalysts (DE-A-1215373).

Apart from the relatively high molecular weight compounds containing at least two reactive hydrogen atoms, it is of course possible to make concomitant use of compounds containing only one reactive hydrogen atom, in particular monools.

c) To modify the mechanical properties, eg. the hardness, the addition of chain extenders, crosslinkers or, if desired, mixtures thereof can prove to be advantageous. Chain extenders and/or crosslinkers which can be used are diols and/or triols having molecular weights of less than 400, preferably from 60 to 300. Examples of suitable chain extenders/crosslinkers are aliphatic, cycloaliphatic and/or araliphatic diols having from 2 to 14, preferably from 4 to 10, carbon atoms, eg. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl) hydroquinone, triols such as 1,2,4- or 1,3,5-trihydroxycyclohexane, glycerol and trimethylolpropane, and low molecular weight hydroxyl-containing polyalkylene oxides based on ethylene oxide and/or 1,2-propylene oxide and the abovementioned diols and/or triols as initiator molecules.

If chain extenders, crosslinkers and mixtures thereof are employed for producing the polyurethanes, they are advantageously used in an amount of from 0 to 25% by weight, preferably from 1 to 5% by weight, based on the weight of the component (b).

d) Blowing agents which can be used are the chlorofluorocarbons (CFCs) generally known from polyurethane chemistry and also highly fluorinate and/or perfluorinated hydrocarbons. However, for ecological reasons, the use of these materials is being greatly restricted or completely stopped. Apart from the HCFCs and HFCs, it is also possible to use, in particular, aliphatic and/or cycloaliphatic hydrocarbons, in particular pentane and cyclopentane, or acetals such as methylal as alternative blowing agents.

These physical blowing agents are usually added to the polyol component of the system. However, they can also be added to the isocyanate component or as a combination both to the polyol component and the isocyanate component.

They can also be used, together with highly fluorinated and/or perfluorinated hydrocarbons, in the form of an emulsion of the polyol component. If emulsifiers are employed, they are usually oligomeric acrylates containing bonded polyoxyalkylene and fluoroalkane radicals as side groups and having a fluorine content of from about 5 to 30% by weight. Such products are sufficiently well known from plastics chemistry, eg. EP-A-0351614.

The amount of blowing agent or blowing agent mixture used is from 1 to 25% by weight, preferably from 1 to 15% by weight, in each case based on the component (b).

Furthermore, it is possible and customary to add water in an amount of from 0.5 to 15% by weight, preferably from 1 to 5% by weight, based on the component (b), as blowing agent to the formative component (b). Water can be added in combination with the use of the other blowing agents described.

e) Catalysts used are, in particular, compounds which strongly accelerate the reaction of the compounds containing reactive hydrogen atoms, in particular hydroxyl groups, of the components (b) and, if used, (c) with the organic, modified or unmodified isocyanates (a). The suitable catalysts are organic metal compounds such as iron(II) chloride, zinc chloride, lead octoate and preferably organic tin compounds such as tin(II) salts of organic carboxylic acids, eg. tin(II) acetate, tin(II) octoate, tin(II) ethylhexanoate and tin(II) laurate, and dialkyltin(IV) salts of organic carboxylic acids, eg. dibutyltin diacetate, dibutyltin dilaurate, dibutyltin maleate and dioctyltin diacetate. The organic metal compounds are used alone or preferably in combination with strongly basic amines. Examples of strongly basic amines are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminoethyl) ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanol compounds such as triethanolamine, triisopropanolamine, N-methyldiethanolamine and N-ethyldiethanolamine and dimethylethanolamine. Further suitable catalysts are: tris(dialkylaminoalkyl)-s-hexahydrotriazines, in particular tris(N,N-dimethylaminopropyl)-s-hexahydrotriazine, tetraalkylammonium hydroxide such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and possibly lateral OH groups.

Preference is given to using from 0.001 to 5% by weight, in particular from 0.05 to 3% by weight, of catalyst or catalyst combination, based on the weight of the formative component (b).

f) If desired, further auxiliaries and/or additives can be incorporated into the reaction mixture. Examples which may be mentioned are flame retardants, surface-active substances, foam stabilizers, cell regulators, fillers, dyes, pigments, hydrolysis inhibitors, fungistatic and bacteriostatic substances.

Details of the auxiliaries and additives which can be used, the other components and the process and reaction conditions in polyurethane production may be found in the specialist literature, for example the monograph by J. H. Saunders and K. C. Frisch "High Polymers", Volume XVI, Polyurethanes, Parts 1 and 2, Interscience Publishers 1962 and 1964, the above-cited Kunststoff-Handbuch, Volume VII, "Polyurethane", or relevant patents, for example EP-A-0711798, DE-A-4408430 or DE-A-19502969.

To produce the polyurethanes, the components are preferably reacted in such amounts that the equivalence ratio of NCO groups of the isocyanates (a) to the sum of the reactive hydrogen atoms of the components (b) and, if used, (c) is 0.80–1.25:1, preferably 0.90–1.15:1.

The polyurethanes are advantageously produced by the one-shot process, for example by means of the high-pressure or low-pressure technique in open or closed molds, for example metal molds. The continuous application of the reaction mixture to suitable conveyor belts for producing foam blocks is also customary.

It has been found to be particularly advantageous to employ the two-component process and to use the demixing-stable component of the present invention, comprising the components (b) and, if desired, (c) to (f), as component (A) and the organic and/or modified organic isocyanates (a), if desired in admixture with further auxiliaries and/or additives (f), as component (B).

The components (A) and (B) are preferably mixed at from 15 to 90° C., in particular from 20 to 60° C. and particularly preferably from 20 to 40° C., and introduced into the open mold or if desired under superatmospheric pressure into the closed mold or, in the case of a continuous workstation, applied to a belt which accommodates the reaction mixture. Mixing can, as already mentioned, be carried out mechanically by means of a stirrer, by means of a stirring screw or by high-pressure mixing in a nozzle. The mold temperature is advantageously from 20 to 110° C., preferably from 30 to 60° C. and in particular from 35 to 55° C.

The homogeneous, demixing-stable polyol component of the present invention can be used for producing polyurethanes having a wide range of properties, for example flexible foams, rigid foams, coatings, casting elastomers, RIM products, integral foams, thermoset foams and thermoplastic PUR. The process of the present invention is preferably used in the production of rigid or flexible foams.

The PURs or PUR foams produced by the process of the present invention have a density of from 10 to 1500 kg/m$^3$.

The present invention is illustrated by the Examples below.

EXAMPLE 1

Comparative Example 50 parts by weight of Lupranol 2022 and 50 parts by weight of Systol S 219 were intensively stirred at room temperature for 10 minutes to give a polyetherol/polyesterol mixture. Distinct phase separation occurred after only 24 hours.

EXAMPLE 1A 0.25 part by weight of 2,2'-dimethyl-4,4'-methylenebiscyclohexylamine was added to the component from Example 1 which had been homogenized by stirring. After stirring for 15 minutes, 0.19 part by weight of Lupranat T 80 was added while stirring vigorously. After addition of the isocyanate was complete, stirring was continued for 10 minutes.

The polyetherol/polyesterol mixture treated in this way was storage-stable for at least 3 months. The reaction behavior did not change compared with the untreated component (Example 1).

EXAMPLE 2

Comparative Example 70 parts by weight of Lupranol 2020 and 30 parts by weight of Systol S 219 were mixed by stirring. Distinct phase separation occurred after only 24 hours.

EXAMPLE 2A 0.25 part by weight of 2,2'-dimethyl-4,4'-methylenebiscyclohexylamine was added to the component from Example 2 which had been homogenized by stirring. After stirring for 10 minutes, 0.19 part by weight of Lupranat T 80 was added while stirring vigorously. After addition of the isocyanate was complete, stirring was continued for 10 minutes.

The polyetherol/polyesterol mixture treated in this way was storage-stable for at least 3 months. The reaction behavior did not change compared with the untreated component (Example 2).

EXAMPLE 3

Comparative Example 57 parts by weight of Lupranol 2042 and 43 parts by weight of Lupranol 2047 were intensively mixed by stirring for 10 minutes. 0.70 parts by weight of triethanolamine, 0.3 part by weight of Dabco 33LV, 0.1 part by weight of Niax Al, 0.6 part by weight of Silikon B 8680 and 3.1 parts by weight of water were added to the component homogenized in this way.

After 24 hours, the originally homogeneous component separated into two phases.

EXAMPLE 3A 0.5 part by weight of 2,2'-dimethyl-4,4'-methylenebiscyclohexylamine and 0.05 part by weight of Lupragen VP 9199 were added to the component from Example 3 which had been homogenized by stirring. After stirring for 15 minutes, 0.38 part by weight of Lupranat T 80 was added while stirring vigorously. After addition of the isocyanate was complete, stirring was continued for 10 minutes. 0.60 part by weight of triethanolamine, 0.2 part by weight of Dabco 33LV, 0.1 part by weight of Niax Al, 0.6 part by weight of Silikon B 8680 and 3.1 parts by weight of water were added to the component homogenized in this way.

The A component treated in this way was storage-stable for at least 4 months. The reaction behavior did not change compared with the untreated component (Example 3).

EXAMPLE 4

Comparative Example 50 parts by weight of Lupranol 1000 and 50 parts by weight of Lupranol 2047 were intensively mixed by stirring for 10 minutes. After 24 hours, the originally homogeneous component separated into two phases.

EXAMPLE 4A 0.5 part by weight of 2,2'-dimethyl-4,4'-methylenebiscyclohexylamine and 0.05 part by weight of Lupragen VP 9199 were added to the component from Example 4 which had been homogenized by stirring. After stirring for 15 minutes, 0.38 part by weight of Lupranat T 80 was added while stirring vigorously. After addition of the isocyanate was complete, stirring was continued for 10 minutes.

The polyetherol/polyetherol mixture treated in this way was storage-stable for at least 3 months. The reaction behavior did not change compared with the untreated component (Example 4).

Lupranol® 2022—OHN 48 mg KOH/g, polyether based on ethylene oxide and propylene oxide for block foam (BASF);

Lupranol® 2042—OHN 27 mg KOH/g, polyether based on ethylene oxide and propylene oxide (BASF);

Systol S 219—OHN 61 mg KOH/g, polyester alcohol based on adipic acid, diethylene glycol and TMP (BASF);

Lupranol 2020—OHN 48 mg KOH/g, polyether based on propylene oxide and ethylene oxide (BASF);

Lupranol 2047—OHN 42 mg KOH/g, polyether based on ethylene oxide and propylene oxide (BASF);

Lupranat T 80—NCO content 48%, tolylene diisocyanate (80/20) (BASF);

Dabco 33LV—amine catalyst (Air Products);

Niax Al—amine catalyst (OSi);

Silikon B 8680—silicone stabilizer (Goldschmidt)

We claim:

1. A process for preparing a homogeneous polyol composition comprising providing a polyol component comprising first and second relatively high molecular weight compounds each containing at least two reactive hydrogen atoms and, optionally, low molecular weight chain extenders and/or crosslinkers, blowing agents, catalysts and further auxiliaries and/or additives, wherein said first and second relatively high molecular weight compounds are not readily miscible in each other, and adding an amine in a proportion of from 0.05 to 7 percent by weight, based on the weight of the polyol component, and an organic and/or modified organic isocyanate in a proportion of from 0.05 to 5 percent by weight, based on the weight of the polyol component, to said polyol component.

2. A process as claimed in claim 1, wherein each of the relatively high molecular weight compounds containing at least two reactive hydrogen atoms is selected from the group consisting of polyetherols and polyesterols containing acidic H atoms.

3. A process as claimed in claim 1, wherein the mean molecular weight of each of the relatively high molecular weight compounds is from 400 to 10,000 g/mol.

4. A process as claimed in claim 1, wherein the weight of the relatively high molecular weight compounds in the polyol component, based on the weight of the polyol component, is a total of from 1 to 95% by weight.

5. A process as claimed in claim 1, wherein the weight ratio of the first relatively high molecular weight compound to the second relatively high molecular weight compound is from 1:99 to 99:1.

6. A process as claimed in claim 1, wherein the amines are selected from the group consisting of primary and secondary amines.

7. A process as claimed in claim 1, wherein the amines are selected from the group consisting of aliphatic and cycloaliphatic amines.

8. A process as claimed in claim 1, wherein the organic and/or modified organic isocyanates are selected from the group consisting of aromatic isocyanates.

9. A process as claimed in claim 1, wherein the organic and/or modified organic isocyanates are selected from the group consisting of prepolymers containing NCO groups or NCO-containing reaction products.

10. A homogeneous polyol composition comprising a polyol component comprising first and second relatively high molecular weight compounds each containing at least two reactive hydrogen atoms wherein said first and second relatively high molecular weight compounds are not readily miscible in each other, and, optionally, low molecular weight chain extenders and/or crosslinkers, blowing agents, catalysts and further auxiliaries and/or additives, said polyol composition further comprising an amine in a proportion of from 0.05 to 7 percent by weight, based on the weight of the polyol component, and an organic and/or modified organic isocyanate in a proportion of from 0.05 to 5 percent by weight, based on the weight of the polyol component.

11. A polyol composition as claimed in claim 10, wherein each of the relatively high molecular weight compounds containing at least two reactive hydrogen atoms is selected from the group consisting of polyetherols and polyesterols containing acidic H atoms.

12. A polyol composition as claimed in claim 10, wherein the mean molecular weight of each of the relatively high molecular weight compounds is from 400 to 10,000 g/mol.

13. A polyol composition as claimed in claim 10, wherein the weight of the relatively high molecular weight compounds in the polyol component, based on the weight of the polyol component, is a total of from 1 to 95% by weight.

14. A polyol composition as claimed in claim 10, wherein the weight ratio of the first relatively high molecular weight compound to the second relatively high molecular weight compound is from 1:99 to 99:1.

15. A polyol composition as claimed in claim 10, wherein the amines are selected from the group consisting of primary and secondary amines.

16. A polyol composition as claimed in claim 10, wherein the amines are selected from the group consisting of aliphatic and cycloaliphatic amines.

17. A polyol composition as claimed in claim 10, wherein the organic and/or modified organic isocyanates are selected from the group consisting of aromatic isocyanates.

18. A polyol composition as claimed in claim 10, wherein the organic and/or modified organic isocyanates are selected from the group consisting of prepolymers containing NCO groups or NCO-containing reaction products.

\* \* \* \* \*